(12) United States Patent
Robert

(10) Patent No.: US 8,371,166 B2
(45) Date of Patent: Feb. 12, 2013

(54) INERTIAL OR RESONATING SENSOR IN SURFACE TECHNOLOGY, WITH OUT OF PLANE DETECTION BY STRAIN GAUGE

(75) Inventor: Philippe Robert, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 357 days.

(21) Appl. No.: 12/692,051

(22) Filed: Jan. 22, 2010

(65) Prior Publication Data

US 2010/0186510 A1 Jul. 29, 2010

(30) Foreign Application Priority Data

Jan. 23, 2009 (FR) ...................................... 09 50431

(51) Int. Cl.
*G01P 15/10* (2006.01)
*G01C 19/56* (2006.01)
(52) U.S. Cl. .................................. 73/514.29; 73/504.12
(58) Field of Classification Search ............... 73/514.29, 73/514.32, 504.04, 504.02, 504.12, 504.14, 73/504.16
See application file for complete search history.

(56) References Cited

U.S. PATENT DOCUMENTS

| | | | | |
|---|---|---|---|---|
| 5,889,208 | A * | 3/1999 | Nose .......................... | 73/504.16 |
| 6,251,698 | B1 | 6/2001 | Lefort et al. | |
| 6,311,556 | B1 | 11/2001 | Lefort et al. | |
| 6,321,598 | B1 * | 11/2001 | Iwaki et al. ................. | 73/504.02 |
| 6,487,864 | B1 | 12/2002 | Platt et al. | |
| 6,584,864 | B2 * | 7/2003 | Greenwood ................ | 73/862.59 |
| 7,389,690 | B2 | 6/2008 | Robert | |
| 2006/0032306 | A1 * | 2/2006 | Robert ........................ | 73/504.02 |
| 2007/0222011 | A1 * | 9/2007 | Robert et al. ................. | 257/415 |
| 2008/0314148 | A1 * | 12/2008 | Robert ........................ | 73/514.33 |
| 2010/0186506 | A1 * | 7/2010 | Robert ........................ | 73/504.12 |
| 2010/0186510 | A1 * | 7/2010 | Robert ........................ | 73/514.29 |

FOREIGN PATENT DOCUMENTS

| | | |
|---|---|---|
| EP | 1 626 282 A1 | 2/2006 |
| EP | 1 840 582 A1 | 10/2007 |
| EP | 2 008 965 A2 | 12/2008 |

(Continued)

OTHER PUBLICATIONS

Xinxin Li, et al., "A Microgyroscope With Piezoresistance for Both High-Performance Coriolis-Effect Detection and Seesaw-Like Vibration Control", Journal of Microelectromechanical Systems, vol. 15, No. 6, XP011151351, Dec. 1, 2006, pp. 1698-1707.

(Continued)

*Primary Examiner* — Helen C. Kwok
(74) *Attorney, Agent, or Firm* — Oblon, Spivak, McClelland, Maier & Neustadt, L.L.P.

(57) ABSTRACT

A MEMS surface sensor, including: a substrate, a surface of which defines a substrate plane; a first zone having a first thickness, of which two surfaces form a first plane and a second plane parallel in relation to one another and to the substrate plane, first zone forming at least one mobile mass that moves in a direction out of the substrate plane; and a second zone, linked to a fixed zone of the substrate, the second zone forming at least a pivot link of the mobile mass in relation to said substrate, and having a thickness less or equal to that of the mobile mass and being linked to the mobile mass, an axis of the pivot link being between the first plane and the second plane, and parallel to the first plane and the second plane.

16 Claims, 13 Drawing Sheets

FOREIGN PATENT DOCUMENTS

| FR | 2 763 694 | 11/1998 |
|---|---|---|
| FR | 2 874 257 | 2/2006 |

OTHER PUBLICATIONS

M. Aikele, et al., "Resonant accelerometer with self-test", Sensors and Actuators A 92, Elsevier, XP4274041A, 2001, pp. 161-167.

W. Geiger, at al., "Decoupled microgyros and the design principle DAVED", Sensors and Actuators A 95, Elsevier, 2002, pp. 239-249.

Mark A. Lemkin, et al., "A 3-Axis Force Balanced Accelerometer Using a Single Proof-Mass", (4B2.01), International Conference on Solid-State Sensors and Actuators, Jun. 16-19, 1997, pp. 1185-1188.

Kianoush Naeli, et al., "Cantilever Sensor with Stress-Concentrating Piezoresistor Design", IEEE, (School of Electrical and Computer Engineering Georgia Institute of Technology), 2005, pp. 592-595.

Kianoush Naeli, et al., "Coupling High Force Sensitivity and High Stiffness in Piezoresistive Cantilevers with Embedded Si-Nanowires", IEEE Sensors Conference, 2007, pp. 1065-1068.

E. Jesper Eklund, et al., "Single-mask fabrication of high-G piezoresistive accelerometers with extended temperature range", Journal of Micromechanics and Microengineering 17, 2007, pp. 730-736.

Navid Yazdi, et al., "Micromachined Inertial Sensors", Proceedings of the IEEE, vol. 86, No. 8, Aug. 1998, pp. 1640-1658.

Junseok Chae, et al., "A Monolithic Three-Axis Silicon Capacitive Accelerometer with Micro-G Resolution", Transducers, International Conference on Solid State Sensors, Actuators and Microsystems, (1D3.2), 2003, pp. 81-84.

Henrik Rödjegård[a], et al., "A monolithic three-axis SOI-accelerometer with uniform sensitivity", Sensors and Actuators A 123-124, Elsevier, 2005, pp. 50-53.

E. Jesper Eklund, et al., "Single-Mask SOI Fabrication Process for Linear and Angular Piezoresistive Accelerometers with On-Chip Reference Resistors", IEEE (Department of Electrical Engineering and Computer Science Univ. of California), 2005, pp. 656-659.

U.S. Appl. No. 12/692,032, filed Jan. 22, 2010, Robert.

\* cited by examiner

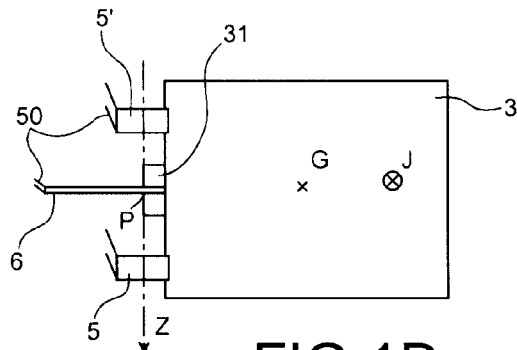
FIG.1D
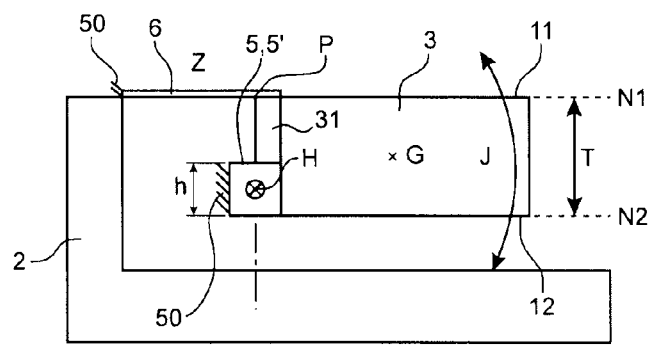
FIG.1E
FIG.1F
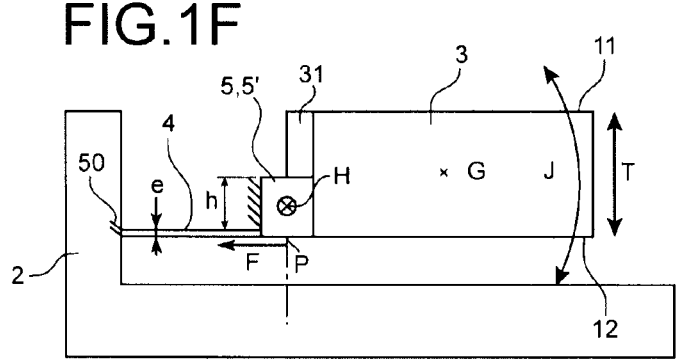
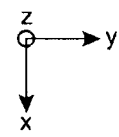
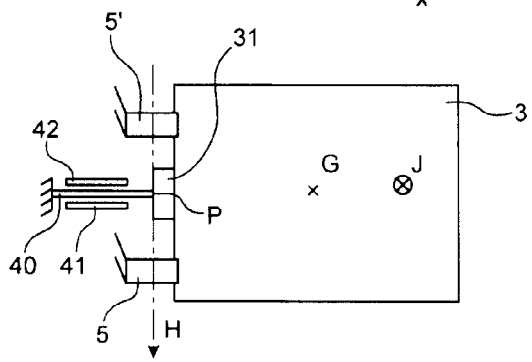
FIG.1G

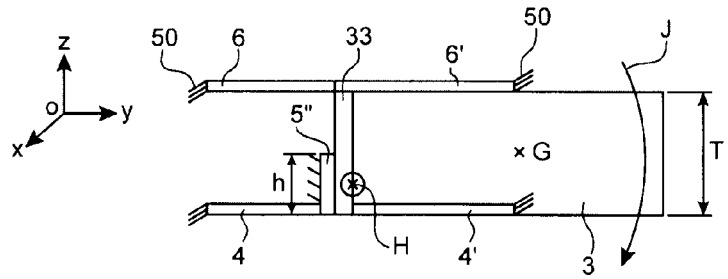
FIG.3B
FIG.3A
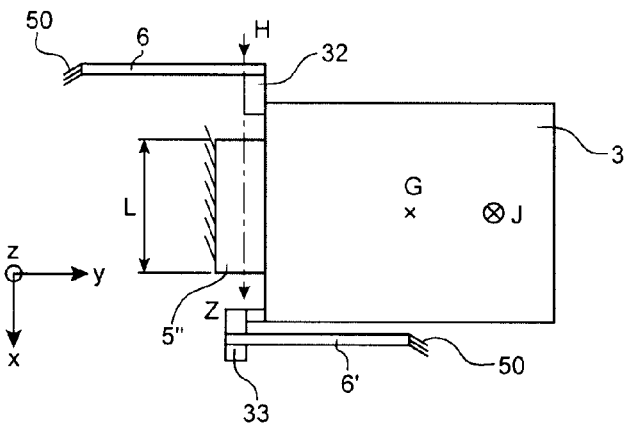
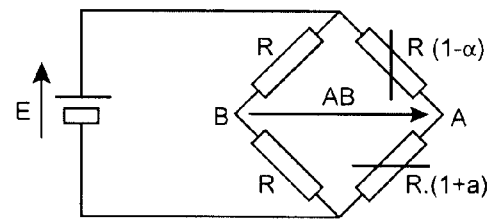
FIG.3C
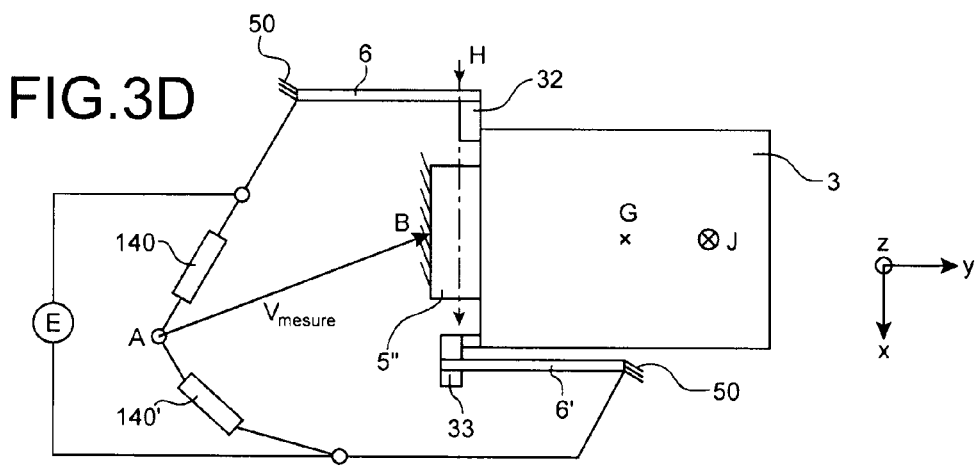
FIG.3D

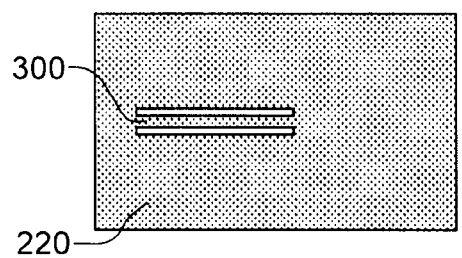
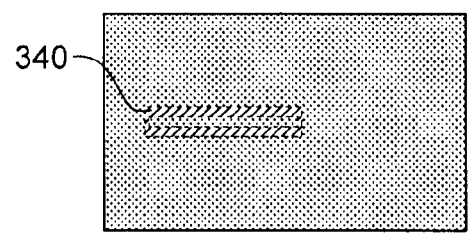
FIG.6A  FIG.6B
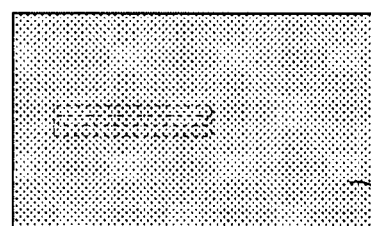
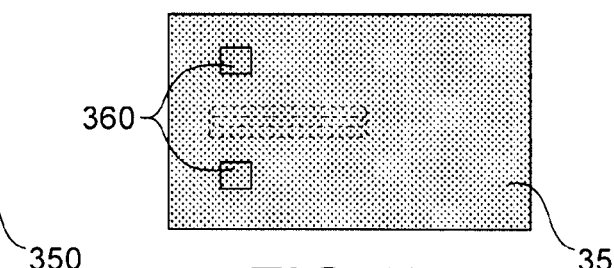
FIG.6C  FIG.6D
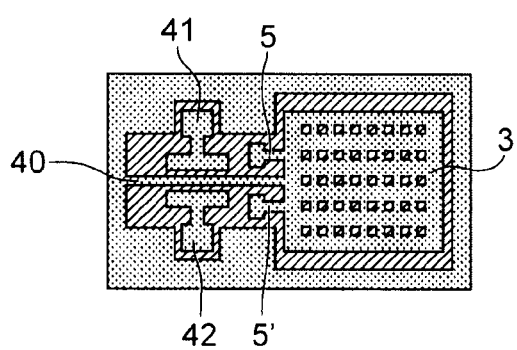
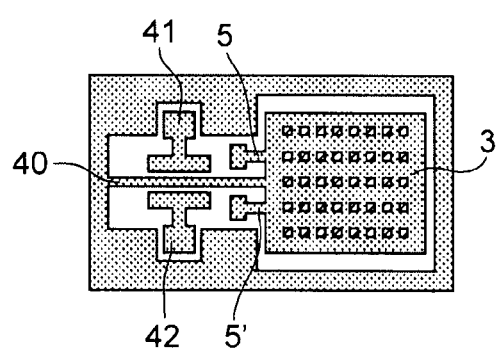
FIG.6E  FIG.6F

INERTIAL OR RESONATING SENSOR IN SURFACE TECHNOLOGY, WITH OUT OF PLANE DETECTION BY STRAIN GAUGE

TECHNICAL FIELD AND STATUS OF THE PREVIOUS TECHNIQUE

The invention concerns the field of micro-sensors, notably made of silicon, for example inertial sensors, in particular accelerometers.

Its application lies in a number of different fields such as automotive, mobile telephone or avionics.

As is known, resonating sensors can be made:
either in volume technology in which case the sensitive part of the sensor is made over the entire thickness of a silicon or quartz using wet etching; this technique is described in FR 2 763 694;
or by surface technology: this technique is described in the document "Resonant accelerometer with self test", by M. Aikele et al., Sensors and Actuators, A92, 2001, p. 161-167.

Inertial sensors made in volume technology are based on the out of plane electrostatic excitation of the resonator. They are of large dimensions.

They require the transfer of 2 substrates, one of which is used to make the excitation/detection electrode(s) and the second is used to close the vacuum cavity. It is also necessary to control the gap between the transferred substrates. The technologies used are therefore complex.

In this type of technique, the detection resonator is thin in relation to the substrate and therefore has a different thickness to the mobile mass. This thinning out, which is very badly controlled, is, among other things, made necessary by the type of beam vibration which is performed out of plane.

Another problem in this type of technique lies in the positioning of the resonator which cannot be optimized in order to increase the effect of the lever arm. In effect, in order to minimize the air gap between the resonator and its excitation electrode, the resonator is placed on the surface of the substrate. In an optimum manner, the resonator should be situated as close as possible to the hinge (rotating axis of the mass).

The problem therefore arises of finding a new design of components, further miniaturized, which makes it possible to overcome the problems referred to hereinabove.

PRESENTATION OF THE INVENTION

The invention proposes a new type of sensor, made using planar technology, making it possible to detect an out of plane effort applied to a released mechanical mass, by using detection by one or several suspended gauges, for example of the piezo-resistive type or else a resonator (beam or diapason). This sensor according to the invention makes it possible to realize, among other things, an accelerator or mass sensor. In particular, it makes possible detection by piezo-resistive gauges but other types of detection are also possible.

This sensor makes it possible to separately optimize the forms, materials and thicknesses of the mobile mass (inertial mass) and of the gauge used for the detection and measurement of the constraint.

More precisely, the aim of the invention is a surface type MEMS sensor, made in a substrate, comprising:
a) a first zone, called thick zone, presenting a first thickness, forming at least a mobile mass of which the first and second surfaces are in a first plane and second plane respectively and running parallel to each other; this mass moves outside of these planes,
b) a second zone, forming at least a pivot link for the mobile mass, linked to the mobile mass and to the substrate, with the axis of the pivot link or torsion axis being in the plane of the sensor or substrate,
c) a third zone, called thin zone, of a lesser thickness or one which is equal to that of the second zone, forming at least a suspended type strain gauge for the detection of the movement of the mobile mass around the axis of the pivoting link, this third zone:
extending in a parallel way or in a plane parallel to the plane of the sensor or substrate but which does not contain the torsion axis of the pivot,
extending in a perpendicular way or in a plane perpendicular to the torsion axis of the pivot,
being linked to the first zone on one side, by at least one point of application of strains and to the substrate on the other side, for example by links of the embedding type.

Such a positioning of the third zone makes it possible to have a thickness of the pivoting zone which is independent of the thickness of the third zone and also makes it possible to obtain preferably a point or points of application of the strains imposed by the first zone on the third zone directly above the H pivoting axis, in other words in a perpendicular plane to N1 and/or N2 containing the H pivoting axis. This makes it possible to increase the lever arm of the seismic mass on the strain gauges.

The second zone has, following a perpendicular direction to the substrate plane, a lower part and upper part, with one of these two parts being in the first plane or in the second plane of the first zone which is therefore called common plane to the first and second zones. In other words, the upper part of the second zone is situated in the first plane (or upper plane) of the first zone and/or the lower part of the second zone is situated in the second plane (or lower plane) of the first zone.

The third zone has, following a perpendicular direction to the plane of the substrate, an upper part and a lower part, one of these zones able to be in the plane common to the first and second zones.

In a device according to the invention, the thickness of the second zone (forming the pivot) is independent of the thickness of the third zone.

The difference in thickness between the third area and the second area makes it possible to have a stress or strain or compression constraint: if these two areas were of the same thickness, it would not be possible to have access independently to these constraints. In the case of detection via piezo-resistive effect, this would then be cancelled.

Preferably, the point or points of application of strains imposed by the first zone on the third zone is directly above the H pivoting axis, i.e. in a plane perpendicular to the first plane and/or to the second plane of the first zone and containing the H pivoting axis. This makes it possible to increase the lever arm of the seismic mass on the strain gauges.

The first and the second zone can be formed in or from semi-conductor or insulation materials. The first and the second zone can be from identical or different materials.

An MEMS sensor is understood to be a sensor including micron and/or sub-micron elements.

Preferably:
the second area has a thickness less than that of the mobile mass,
and/or has a width, according to the direction of the pivoting axis, less than the width of the mobile mass following this same direction;

and/or has an extension following a parallel direction to the pivoting axis; the second zone includes, for example, two lengthened portions, each located at a side of the mobile mass, or situated in an opening made in the mobile mass.

In a sensor according to the invention, the second area, forming a pivoting link for the mobile mass, does not allow any rotational movement of the latter around the pivoting axis, thereby preventing any other movement of the mobile mass. In particular, the second zone can include several sections aligned along the pivoting axis.

The mobile mass can have a thickness which is strictly greater than that of the second zone (forming the pivot). The latter itself has a thickness which is strictly greater than that of the third zone, including the strain gauges, which advantageously is two times greater than the thickness of the third zone.

The strain gauge(s) and the mobile mass can have a common plane, which can be the lower plane of the mass. The gauges and the mobile mass are in this case situated on the same side in relation to this plane. Alternatively, they can have as the common plane the upper plane of the mass. The gauges are in this other case situated on one side of this plane and the mobile mass is situated on the other.

Preferably, the axis of the pivoting axis is in the plane going through the center of gravity G of the mobile mass. This plane is parallel to the first plane and to the second plane.

The third area can include at least two strain gauges, situated anti-symmetrically one in relation to one another and in relation:
to a perpendicular plane of the first and second planes of the mobile mass and containing the torsion axis,
and to a perpendicular plane to the torsion axis.

The strain gauge(s) can be of piezo-resistant material such as monocrystalline silicon or polycrystalline or SiGe, or of nanowires, for example made from silicon, nanotubes, for example of carbon. It can then be used as a suspended gauge of which the electrical resistance variation is then measured according to the strain which is applied to it.

It can be made by etching into a semi-conductor substrate. Alternatively, it can be made from a piezo-resistive material such as polycrystalline silicon, silicon nanowire or carbon nanotubes. Alternatively, the gauge can be from a material such as metal, for which the deformation modifies the resistance through geometrical effects.

Nanowires, in particular those made from silicon, are extended shape structures which follow a direction which is called the length. The transverse dimensions, in a section perpendicular to this direction are greatly inferior to this length. These transverse dimensions are typically less than 100 nm, and are preferably less than 50 nm or 40 nm and advantageously less than 20 nm. Nanowires which are oriented in an X direction, contained in the plane of a substrate, can be obtained by etching a silicon beam following the Y and Z transverse directions, or by growth of a nanowire, for example using catalyzed SLV deposition.

The gauge, for example a variable resistance gauge, can be of the single wired type, with current being able to enter through the gauge and exit by one of the pivot zones or vice versa. Alternatively, the gauge can be of the double-wired type with current being able to enter by one of the wires and exit via another. The two wires can be parallel to each other, with electrical insulation preferably being placed between the gauge on the one hand, and the first zone on the other.

Alternatively, the strain gauge(s) can include a vibration detection resonator in the plane of the substrate, including at least one vibrating blade, a means of excitation and a means of vibration detection.

The strain gauge can therefore be a detection resonator, for example of a beam or diapason type, of which the frequency variation is therefore measured according to the strain which is applied to it.

The vibrating of the gauge in the plane of the substrate can be made using electro-static means. The detection resonator is excited to the resonance. The variation of the detection resonator's vibration frequency is based on the strain applied by the mass.

The excitation of the vibrating blade and/or the resonance detection can then be done by electrostatic means through at least one electrode placed, in relation to the vibrating blade, in the direction of the vibration.

The resonance detection can also be made by using piezo-resistive means placed on the vibrating blade.

The vibrations can therefore be measured by electrodes placed in the sensor plane. Alternatively, the gauge is excited by electrostatic means and the strains are measured by piezo-electrical means placed on the resonator.

A sensor according to the invention can be an accelerometer sensor, the strain applied by the mass being due to the inertia of the mass during a movement of the sensor assembly.

In this case, an acceleration out of the plane of the sensor will make the first zone pivot, which forms a mobile mass, of an angle $\alpha$ around the axis of the pivot link of the second zone. This rotation of the mobile mass will exert a strain on the strain gauge. Where the gauge is a resonator, this strain induces a variation of its frequency and/or of the vibration amplitude. Where the gauge is of the piezo-resistive type or of the suspended metallic gauge type, this strain induces a variation to its electrical resistance proportional to the strain exercised. It is then possible to calculate the acceleration.

In a sensor according to the invention, the pivoting axis and the central axis of the gauge are in two different planes, parallel to the sensor and/or substrate plane in which this is realized. The constraint on the gauge is amplified by the lever arm formed between the center of gravity G of the mobile mass, where the force is applied due to the acceleration, the pivot axis and the application point of the strain on the gauge. The closer this application point is to pivot axis H, but without actually being on this axis, the greater the measured strain.

The application point of the strain on the gauge is preferentially situated vertically to the pivot axis. Also as a preference, the pivot axis is situated in the same plane, parallel to that of the sensor, as the center of gravity of the mobile mass.

A device according to the invention can also include means to trigger vibration or movement of the mobile mass, notably for the realization of the chemical sensors or mass sensors. These means of triggering vibration or movement of the mobile mass can include:
an electrode present on the substrate facing one of the main sides of the mobile mass; this electrode can be connected to a voltage generator able to periodically produce a variable voltage, with the mobile mass then being connected to the same voltage generator,
or a layer of conductive material placed on the mobile mass and linked to the substrate, electronically isolated from the mobile mass, for example by an insulation layer forming a bimetal with the mobile mass; this layer can be connected to a voltage generator capable of producing a periodically variable voltage,
or a layer or piezo-resistant material, placed on the mobile mass and connected to the substrate; this layer can be electrically connected to a generator means of production of a periodically variable voltage within the piezoelectric material, for example electrodes present on and under the piezo-electric layer.

Means of production of a periodically variable voltage can include:
- electrodes between which the piezo-electrical material is placed,
- a voltage generator linked to said electrodes.

A voltage or current variation imposed to the means of triggering the vibration leads to a local deformation of the mass and therefore to a triggering of movement. This movement becomes a vibration if the impulsion given by the vibration triggering zone is due to, for example, the impulsion of an alternative current.

The invention therefore also concerns a resonator type chemical mass sensor, including a device according to the invention equipped with means to trigger the vibrating of the mobile mass. The vibrating mobile mass can then be described using the term "vibrating beam".

Advantageously, the vibrating beam can also include on its surface means to select molecules or one type or several types of molecules or one type or several types of molecules or families of molecules able to be adsorbed or absorbed on the surface, for example using molecule radicals or a layer or material which is sensitive to a single type of molecule.

For example, the surface of the vibrating beam can be covered with a material which reacts in a particular way with a chemical and/or biochemical element and/or involves hooked molecules which are specific to a molecule or family of molecules.

As such, vibrating in an environment containing the target molecule(s), the vibrating beam sees its mass increase as the molecules are adsorbed. The vibration frequency therefore varies and the strains applied to the strain gauges are modified.

Such a device can be used to detect the presence and/or the concentration of one or several molecules in an environment.

An advantage of this device, in relation to a chemical mass sensor of which the movement axis of the vibrating beam is in the plane, is the following. Triggering the vibration of a beam, along an axis which is perpendicular to the substrate plane, in particular a beam with a significant width, offering an important molecule capturing surface is easier to make in thin layer technology than a triggering of vibration in the plane.

During the use of a device in accordance with the invention, the mobile mass is, advantageously, in a gaseous environment or in the vacuum. In the case of a mass sensor, or of a chemical sensor, the mobile mass, or vibrating beam, is brought into contact with a fluid, or a carrier fluid.

A strain gauge of the detection resonator type is advantageously in an environment which is close to vacuum. In effect, the attenuation due to a gaseous environment would degrade the quality factor of the resonator and would therefore diminish the sensor's resolution.

As such, for these reasons, a device according to the invention will preferably have a variable resistance strain gauge, for example of the piezo-resistance type.

In a device according to the invention, all electrical connections can be made through integration at the front side of the substrate, before and after the device has been formed according to the invention.

The aim of the invention is also a manufacturing process for a surface type MEMS sensor, characterized:
- by the sensor being manufactured within a layer of semi-conductor material, for example monocrystalline or polycrystalline silicon or in a layer of SiGe, present above a sacrificial layer which is itself, for example, laid on a semi-conductor substrate or glass type insulator,
- and in that the process comprises the realization of:
  a) a first zone, presenting a first thickness, forming at least one mobile mass,
  b) a second zone, linked to the mobile mass so that the single movement axis allowed to the mobile mass is a rotation around an axis included in the sensor plane, called torsion axis, with the second zone thereby forming a pivot link in the sensor plane,
  c) a third zone, called thin zone, of a lesser thickness than the thick zone, forming at least one suspended type strain gauge for the detection of the movement of the mobile mass around the axis of the pivot with this third zone:
     - extending in a parallel plane to the sensor plane but not containing the torsion axis of the pivot,
     - extending in a perpendicular plane to the torsion axis of the pivot,
     - being linked to the mobile mass.

The three zones can be formed by etching on a layer of semi-conductor material with the etching of the sacrificial layer making it possible to release the mobile part of the sensor.

They can notably be formed by the etching of a superficial layer of semi-conductor material of an SOI substrate with the oxide layer of the SOI serving as the sacrificial layer and electrical insulator for the fixed parts.

The thin area can be made in a superficial layer placed on the semi-conductor substrate, the two first areas made by etching a layer of semi-conductor material, the etching of the sacrificial layer making it possible to release the mobile part of the sensor.

The second zone can have a thickness between that of the first zone and that of the third zone. The second zone can be of a thickness which is equal to that of the first zone.

This process makes it possible to realize a device according to the invention, as described above. The other features of a device according to the invention therefore apply to a procedure according to the invention.

BRIEF DESCRIPTION OF THE DRAWINGS

FIGS. 1C and 1D show, in side view and top view respectively, another accelerometric sensor according to the invention, of a planar type, with an out of plane sensitive axis and deposited strain gauge, FIGS. 1E and 1F both show in a side view, another planar type accelerometric sensor according to the invention with an out of plane sensitive axis and strain gauge, and a reduced thickness pivot zone, FIG. 1G shows a sensor according to the invention of which the strain gauge is of the detection resonator type, FIGS. 3A and 3B show as a side view and top view respectively, another planar type accelerometric sensor according to the invention with an out of plane sensitive axis and strain gauges differentially or opposition mounted, FIGS. 3C and 3D show the diagram of a differential Wheatstone bridge (FIG. 3C) and its application to a device according to the invention, having two gauges and, in this case, having a broad pivot zone (FIG. 3D), FIGS. 5A-5G and 6A-6F, show a first embodiment of a process according to the invention.

DETAILED PRESENTATION OF SPECIFIC EMBODIMENTS

Figure 1A:
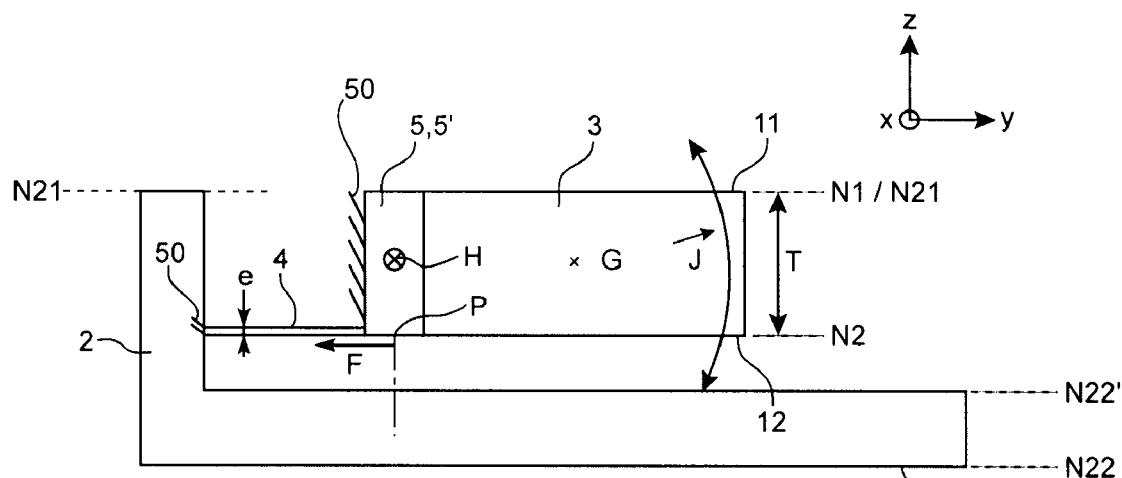
FIGS. 1A and 1B show, from a side and top view, an accelerometer sensor according to the invention, of a planar type with an out of plane sensitive axis and etched strain gauge.

Different embodiments are shown in FIGS. 1 to 4 in which the reference to the same element is common to the different figures.

The properties which are common to the various embodiments of the invention will be described first. Then the particular features of each of the embodiments will be presented.

A sensor according to the invention is included or realized in a substrate or a wafer 2, for example in semi-conductor material, for example in monocrystalline or polycrystalline silicon or in a layer of SiGe, deposited on a silicon substrate or in a glass type material. This wafer has an upper side 21 (or first side) and a lower side 22 (or second side). These numerical references are shown on FIG. 1A by means of an example but may also be used on other figures. These two sides 21 and 22, are parallel and each is situated in a plane N21 and N22 (which can be called upper plane N21 and lower plane N22, or even first plane N21 of the wafer and second plane N22 of the wafer). As such, the sensor or its mobile mass 3, included in wafer 2, also has an upper side 11 (or first side) and a lower side 12 (or second side), with the sensor's upper side 11 being in a plane N1 which can be identical to the plane N21 of the upper side 21 of the wafer. The lower face 12 of the sensor is in a plane N2, different to the lower plane of wafer N22. N2 is included between upper planes N1/N21 and the lower plane of wafer N22. Hereinafter, the terms "side" or "plane", without mention of the wafer, corresponds to the planes and sides of the sensor: N1 and N2.

The adjectives "lower" and "upper" are chosen for ease but do not express a definitive relative position of one of the planes in relation to the other. The expressions "first side" and "second side" can also be used respectively. The so-called lower side of mass 3 faces and is parallel to a side 22' of the substrate updated by etching when implementing a process to make the device according to the invention. This side 22' is, for example, included in a plane N22' located between N2 and N22.

An orthonormal marker is defined including two perpendicular axes one in relation to the other, X and Y, situated in one of the planes N defined above, with the third axis Z, being the axis which is perpendicular to the planes N.

An accelerometric device according to the invention includes a mass 3 of a first thickness of T, measured according to the direction Z perpendicular to the sides or to the plane of the wafer (similar to the thicknesses mentioned later on in this text). The planes of this mass parallel to the plane N of the wafer define the first plane N1 and the second plane N2 of the sensor. This mass 3 forms a mobile mass. It can be of the same material as that used in substrate 2. It is, for example, made of monocrystalline or polycrystalline silicon or even from SiGe, or from a glass type material. The thickness T of the mass 3 is, for example, between 500 nm and 10 µm, for example 1 µm.

Furthermore, the mass 3 can have a length L, measured according to the Y axis of the XY plane, of between a few micrometers and a few hundredths of µm, for example between 10 µm or 50 µm and 100 µm or 200 µm or 500 µm, and a width 1, measured according to the X axis of the XY plane which can be between a few micrometers and a few hundredths of µm, for example between 10 µm or 50 µm and 100 µm or 200 µm or 500 µm.

This mobile mass is connected to a second zone 5, of second thickness, which thus forms a pivot link, also called hinge, of H axis parallel to the planes N defined above (this H axis is perpendicular to the plane of the FIG. 1A). The H axis is placed between the first plan (N1) and the second plan (N2) of mass 3, and parallel to each of this. The X axis of the referential linked to the substrate can be chosen as being the direction of the H rotating axis. Moreover, Z is perpendicular to each of the planes N. It is therefore sufficient to choose the direction Y perpendicular to the directions X and Z in order to completely define the orthonormal marker.

The pivot forming area includes an upper part and a lower part placed at different heights according to the Z axis. It is included between the two planes N1 and N2 which respectively comprise the upper side and lower side of mass 3. If its lower part is in the plane N2, the plane N2 is therefore said to be common to the first and second parts. In addition, or as an alternative, the upper part if the pivot forming zone can be in the plane N1, the plane N1 is then called the common plane to the first and second parts. In the embodiment of FIG. 1A, the upper part and the lower part of the pivot forming zone are respectively in the plane N1 and in the plane N2 and these two planes N1 and N2 are therefore common to the first and second parts.

Advantageously, the geometry and/or the dimensions of the pivot zone are such that rotating axis H is in a parallel plane to the planes N going through the center of gravity G of the mobile mass. This makes it possible to reduce sensitivity to transverse accelerations. This particular position of the rotating axis is obtained particularly when the thicknesses of the first and second zones are equal following direction Z.

Mobile mass 3 can make a rotation J around the pivot axis and can make no other movement in the orthonormal referential XYZ linked to the substrate, and notably no movement around another axis. In the alternatives of the embodiment in FIG. 1A-1G or 9A-9D, this effect of blocking the other rotations is obtained when the pivot zone or hinge is comprised of two parts 5 and 5' aligned along the H axis. Alternatively, the hinge zone can be of a single piece, sufficiently wide in accordance with the direction X to limit the rotations of the mass in accordance with the other axes. The movement permitted for the mobile mass is therefore a movement J out of the plane of the sensor. Hinge zone 5, is linked to mobile mass 3 and to a fixed zone 50 of the device. It has, for example, a link of the embedded type with the substrate, or anchored in the substrate, in which the device is formed.

Figure 9A:
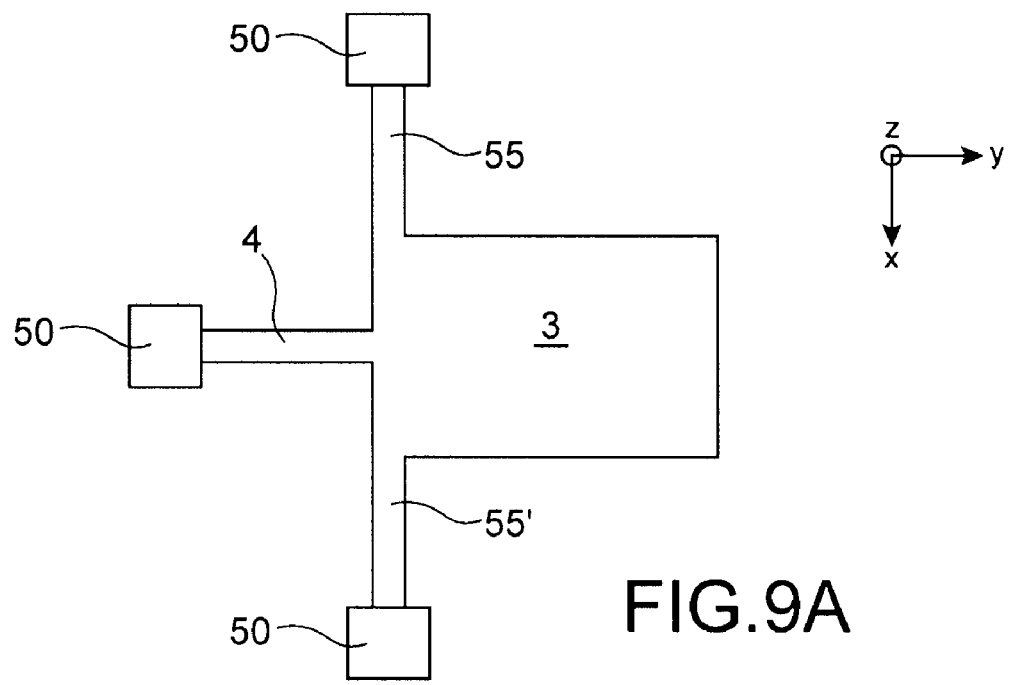
FIGS. 9A-9D show alternatives of a device according to the invention.
Figure 9B:
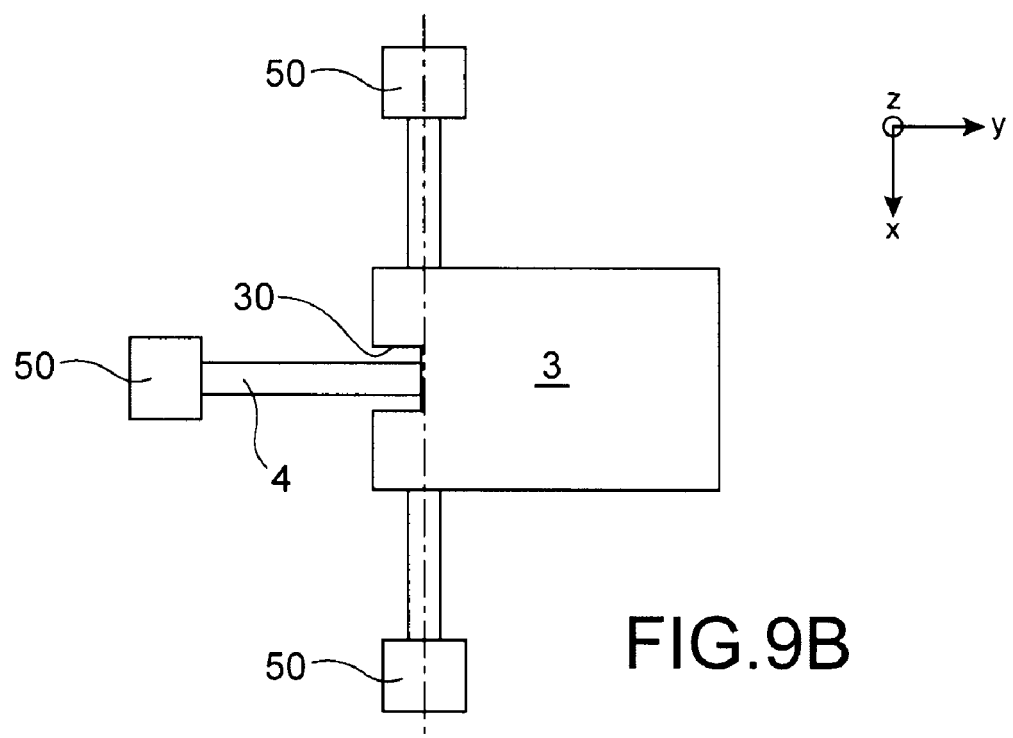
Figure 9C:
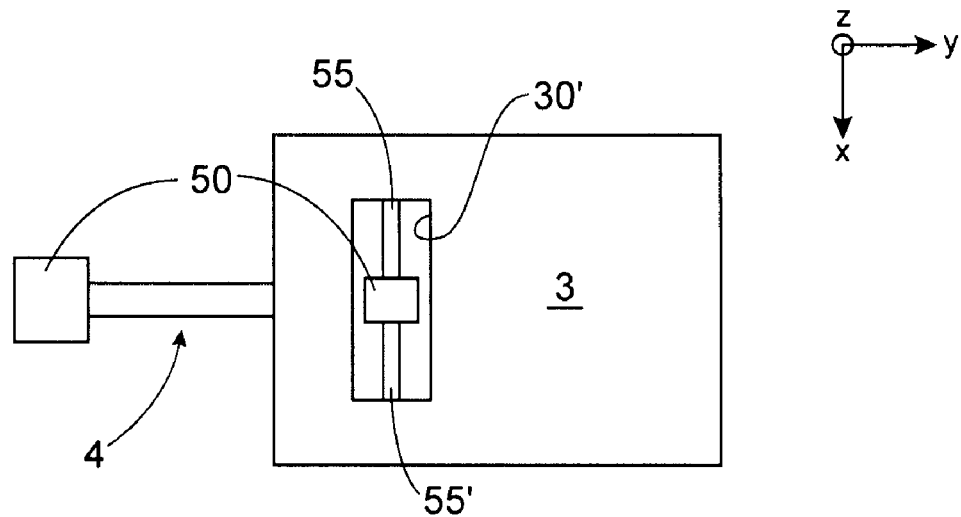
Figure 9D:
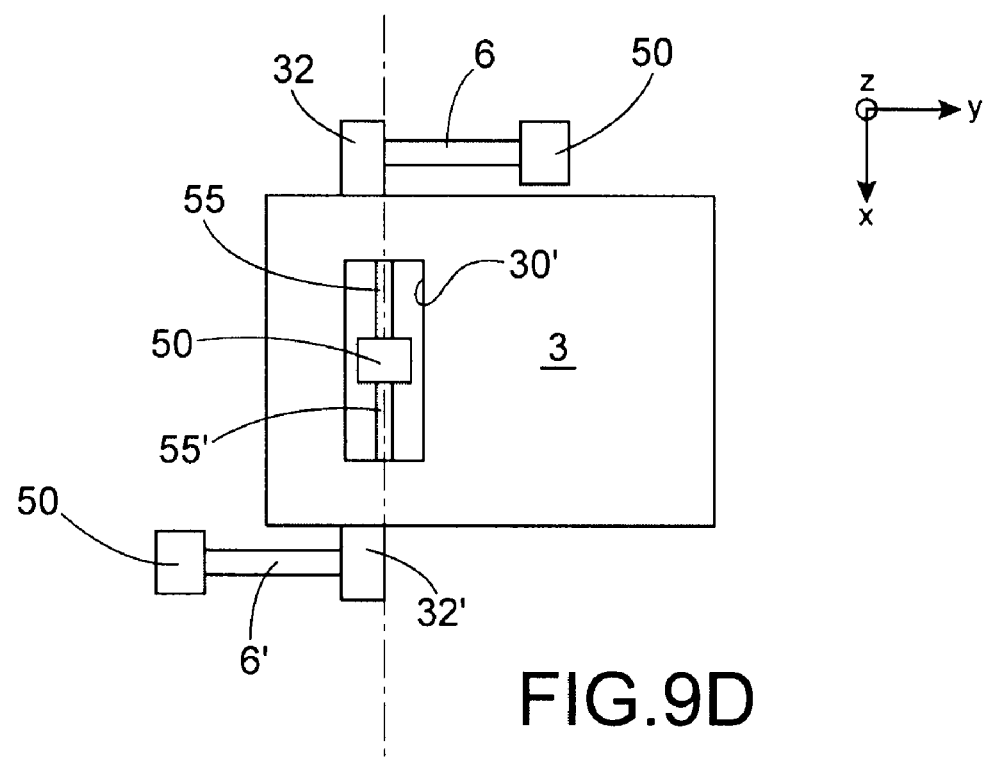

Preferably:
the second zone has a lower thickness that than of mass 3 (including the cases of FIGS. 9A-9D),
and/or has a width, according to the direction of pivot axis H, lower that the width of mobile mass 3, according to this same direction;
and/or includes two extended arms placed on both sides of mobile mass 3 (FIGS. 9A-9B) or in a notch 30' made in this mobile mass (FIGS. 9C and 9D).

Consequently, a movement of the mobile mass results in a deformation of the second zone (pivot zone) and not a deformation of the entire mobile mass.

Finally, a third zone 4, forms at least a suspended strain gauge of thickness e which is weaker than that of mobile mass T. It provides a means of detecting movement of mobile mass 3. Preferentially, thickness e of the gauge(s) is between, on the one side, 10 nm or a few tenths of nm (for example 40 nm for a strain gauge of the nanowire type or 200 nm for a suspended strain gauge in polycrystalline silicon) and, on the other side, a few micrometers, for example 1 μm or 5 μm or 10 μm.

A so-called "suspended" gauge is maintained between two parts referred to as end parts. The part of the gauge which is called the central part, placed between these two end parts is of a non-zero length and is not in contact with any other material, and particularly with none of the materials which make up the sensor.

In general, such a gauge is extended along a direction and of a length, referred to as gauge length, which is very large in this direction compared to each dimension measured in a perpendicular section to said direction. It is maintained at both end parts which are each of a weak or very weak length compared to the length of the gauge or of its central part.

This strain gauge 4 extends in a plane which is parallel to the sensor plane but which does not contain rotating axis H of the pivot link, as this is shown on FIG. 1A. This remains true for the embodiments of FIGS. 9A-9D. One of its ends is in contact with the mobile mass and the other with the substrate which remains fixed. These two points can be for example connections of the embedded or anchored type. This strain gauge 4 is placed between two planes, or comprises a lower part and an upper part positioned at different altitudes following a direction which is perpendicular to that of the substrate. One of these planes, or one of these parts, is one of the planes N1, N2, or is contained in one of these planes and, preferably, in the plane common to the first and second zones. In this case, the gauge is said to be aligned with the upper of lower part of the second zone and of mobile mass 3 (when this is at rest).

Figure 1B:
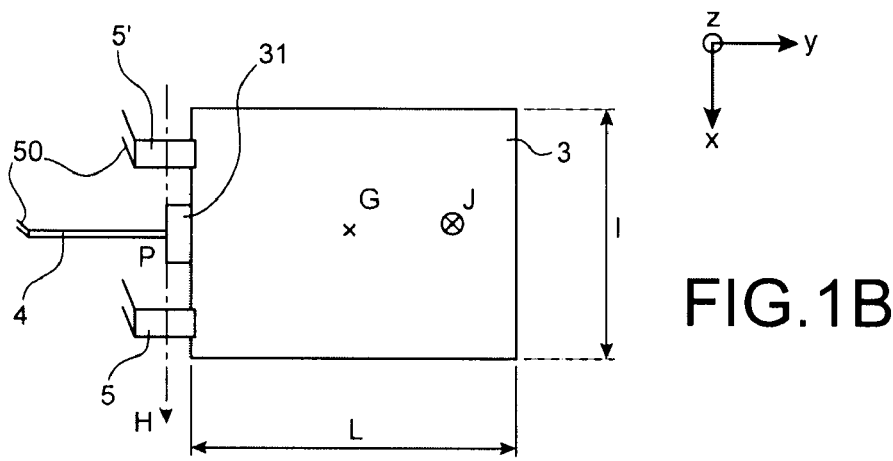

As can be understood from FIGS. 1A and 1B, the second zone and the third zone each have a length, according to the X axis, less than that of mass 3 again according to X. The sum of these lengths of the third and second zones is less than that of the mass. This is particularly the case when the gauge has a plane in the common plane of the first and second zones. But this can also be the case for any embodiment of the invention, regardless of the position of the gauge and of the second zone.

Advantageously, this third zone is from a piezo-resistive material, for example monocrystalline or polycrystalline silicon or it is composed of nanotubes of carbon or nanowires of silicon or it is in metal, etc.

Alternatively, the strain gauge, as presented below, can be a detection resonator.

A rotation J of the mobile mass around the pivot link Z results in the application of a force F exerted on strain gauge(s) 4. The point of application P of the strain on gauge 4 is advantageously in a plane containing the H axis of the pivot link and perpendicular to the substrate or to each of the higher N2 and lower N1 planes. This point of application is therefore called "vertical" to the rotating H axis of pivot link 5, which, at a first order, only enables it to have only one axial strain on the gauge. Preferentially, the direction of strain gauge 4 is normal to the plane containing the H axis which is itself perpendicular to the plane of the device.

A first embodiment of the invention concerns an accelerometer type device (FIGS. 1A to 1G). Alternatives will be described, a first in connection with FIGS. 1A, 1B, a second in connection with FIGS. 1C, 1D, a third and a fourth in connection with FIGS. 1E, 1F, a fifth strain gauge alternative is shown in FIG. 1G. Other alternatives are described later with FIGS. 9A-9D.

In the alternative in FIGS. 1A and 1B, the point of application P of the strain is furthermore in a perpendicular plane to the H axis, containing the center of gravity G of mobile mass 3.

Moreover, the gauge is placed below torsion axis H. In other words there is a common plane between the mobile mass, the second zone (5, 5') and strain gauge 4, this common plane is the lower plane N2 of the mobile mass including lower side 12 of mass 3; it can be said that the gauge is placed in the lower plane of mobile mass 3 is the configuration shown. In this case, the gauge is advantageously formed by etching. The gauge and the mobile mass are situated on the same side of the common plane N2.

Figure 1C:
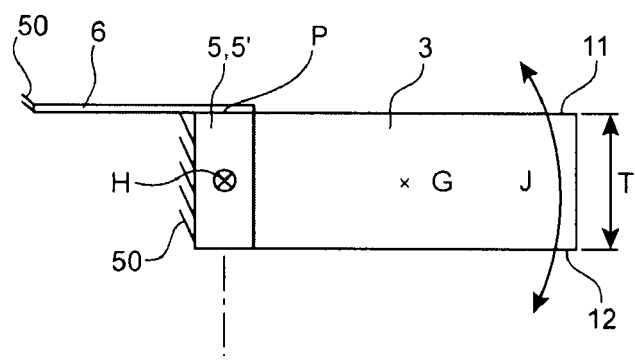

Another alternative of this embodiment is shown in FIGS. 1C and 1D: the gauge(s) 6 is(are) partly placed above torsion axis H. In this case, preferably, the gauge(s) 6 is(are) formed by deposition. There is therefore a common plane between the strain gauge(s) 6, pivot zone 5 and mobile mass 3, in fact the upper plane N1 of the sensor containing side 11 of the device. Gauges 6 and mobile mass 3 are, in this alternative, situated on either side of this plane which is common to them (the latter contains the lower part of gauges 6 and upper part 11 of the mass).

In the alternatives in FIGS. 1A-1D, zone 5 forms a pivot with a thickness close to that of mass 3. Advantageously, zone 5 has the same thickness as mobile mass 3. The H pivot axis is then in the same plane, parallel to the plane of substrate 2, as the center of gravity G of mobile mass 3. Moreover, zone 5 then has two planes, parallel to the plane of substrate 2, in common with the mobile mass 3. These are planes N1 and N2. This remains true in the embodiments of FIGS. 9A-9D.

Alternatively, it is possible to reduce the height of the pivot zone. This is the case for the alternatives in FIGS. 1E and 1F in which height h of pivot zone 5 is strictly lower than that of the mobile mass T and is strictly greater than that of strain gauge(s) 4, 6. The reduction of the width of pivot zone 5 leads to a reduction in its stiffness. This can also be applied to the embodiments in FIGS. 9A-9D.

Pivot zone 5 therefore has its lower part in the lower plane N2 of the sensor, containing rear side 12 of mass 3 (their common plane is plane N2, but not plane N1). The pivot zone, of a finer thickness than the mobile mass, is therefore positioned close to the lower part of mobile mass 3. The H axis can therefore also be closer to this lower part of mass 3. This situation slightly changes the force imposed on strain gauge 4, and therefore the value and the precision of the measurements.

In effect, in this particular case, the effect of the low position of rotating axis H is to increase the strain on gauge 4 situated closer to the pivot axis H, in the lower plane N2 (case shown in FIG. 1F). The gauge then has a lower part in the lower plane N2 of mass 3. Here, this plane N2 is common to the three zones.

Conversely, in the case of a pivot zone located in the lower part of mass 3, the strain applied to a strain gauge 6, situated "above" the mobile mass (case shown in FIG. 1E, gauge situated on the side of the mobile mass close to upper part 21 of substrate 2) is reduced. The gauge then has a lower part in the upper plane N1 of mass 3. The plane N2 is then common to only the first and second zones.

The case shown in FIG. 1E is preferably that of a deposited gauge, that in FIG. 1F is that of an etched gauge.

In the cases shown in both these figures, pivot zone 5 is of a lesser thickness than mobile mass 3.

Another alternative of a deposited type variable resistance strain gauge, for example a piezo-resistive type, can include a strain gauge made up of two parallel gauges. This alternative embodiment will be presented below in relationship to FIG. 2C.

Regardless of the alternative considered for this embodiment, alternatively, the strain gauge can be of a vibration detection resonator type in the substrate plane (FIG. 1G).

This resonator has a vibrating blade 40, a means of excitation 41 and a means of measurement 42.

The means to produce the excitation of the vibrating blade can be an electrode forming a condenser with the vibrating blade 40 and connected to an alternative current generator not shown as a diagram (FIG. 1G). The resonator vibrates then in the XY plane formed by the plane of substrate 2. The electrodes in question are situated in relation to one other within a plane parallel to the plane of substrate 2. This situation is therefore different to that of the U.S. Pat. No. 6,251,698, wherein the different electrodes of the gauge are on top of each other and where the gap between the electrodes is a few micrometers and is difficult to control since it is obtained by the sealing of a second substrate onto a first substrate. In a device according to the invention, the vibration is in the plane, the gap between each electrode and the vibrating blade is also in the plane of the substrate and can be formed using a photolithograph (standard optical device or stepper) with a controlled gap width which can be sub-micronic.

During the application of a strain according to the length of strain gauge 4, perpendicular to the vibration direction of blade 40, the vibration frequency of the blade will vary. This variation is measured by measurement means 42.

The means of measuring the vibrating blade vibration 40 can be of the piezo-resistive type, as described in FR 0 803 495 dated Jun. 23, 2008, or be electrostatic, including an electrode 42, thereby measuring the vibration frequency of the blade by measuring the variation of the capacity formed between the vibrating blade and the measuring electrode, with electrode 42 being positioned, in relation to the vibrating blade, in the direction of vibration of the vibrating blade.

In the alternative of the first embodiment of the invention described in FIG. 1G, the means of excitation 41 and the measurement means 42 are both capacitive.

In those cases where the measurement of the strain is obtained by variable resistance gauges (FIGS. 1A to 1F), for example with piezo-resistive gauges, the measurement of the force imposed by the movement of mobile mass 3 on the strain gauges 4 or 6 can be realized through a Wheatstone bride (of which the principle is set out in diagram form in FIG. 2A) positioned in such a way as to evaluate any variation in the resistance formed by the gauge. Consequently, if Rx is the resistance of the gauge at rest (the mobile mass is not moving), a rotation of the mass 3 around the H axis will result in variation of this resistance, which becomes $Rx \times (1+\alpha)$. The bridge makes it possible to measure the value of $\alpha$.

This Wheatstone bridge can be applied according to two alternatives to the device according to the invention described in the first embodiment, these being alternatives which depend on the structure of the strain gauge.

Figure 2A:
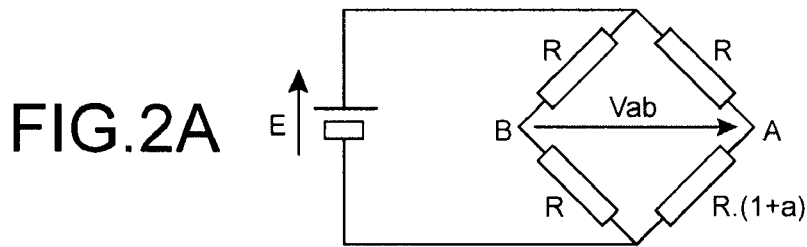
FIGS. 2A to 2C show a Wheatstone bridge (FIG. 2A), applied to a device according to the invention, with a single strain (FIG. 2B) or double strain (FIG. 2C)
Figure 2B:
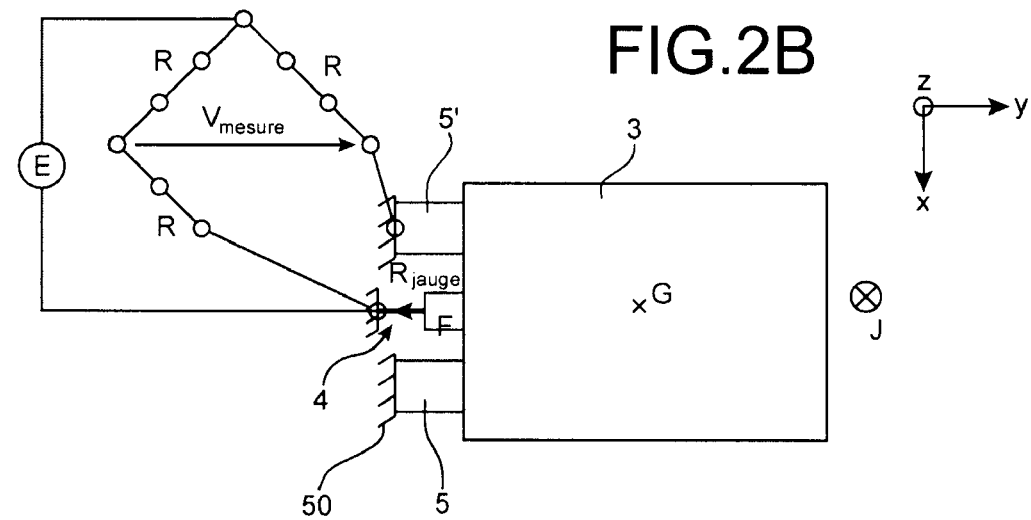
Figure 2C:
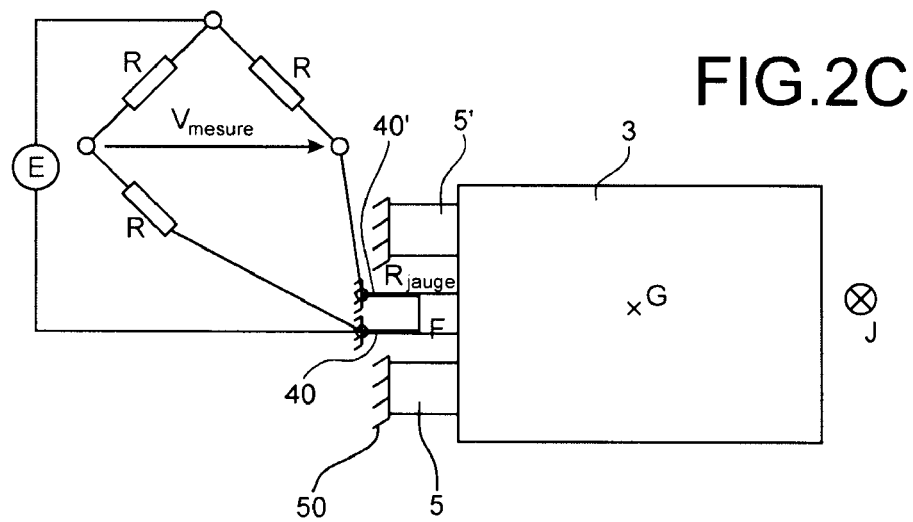

In a first alternative, as shown in FIG. 2B, the piezo-resistive strain gauge is composed of a single connection 4, the current input is therefore provided through the pivot zone (for example through pivot 5) and the output via connection 4 (or vice versa). The Wheatstone bridge then measures the variation of the Rx' resistance of the single connection of strain gauge 4 and of the resistance formed by the current input crossing pivot zone 5 and a part of mobile mass 3.

In a second alternative, (FIG. 2C), the suspended strain gauge 4 is formed of two parallel arms 40 and 40'. It is situated on the same plane parallel to that of the seismic mass 3. In the case of deposited type strain gauges, an electrical insulation layer is placed between gauge 4 and mobile mass 3. The current is brought in by an arm 40, and exits by the second arm 40' (FIG. 2C), or vice versa. The advantage of this alternative is a measurement with less noise of the Rx" resistance variation. Indeed, differently to the method described previously where the torsion of the pivot zone, which is used to conduct the current, can make the resistance vary, the resistance variation measured by the Wheatstone bridge is as such due only to the forces imposed on the strain gauge. The current does not go through additional parasite resistances.

What is explained above, in relation to the gauges and to the third zone, is directly applicable to the embodiments in FIGS. 9A-9D.

A second embodiment of the invention, shown in FIGS. 3A and 3B, also applicable to the embodiments in FIGS. 9A-9D (except for what directly relates to the position of the second zone or pivot zone), uses the general principle of the accelerator type device used in the first embodiment, but has other alternatives.

As in the first embodiment, it includes a mobile mass 3 associated with a substrate having an upper side 21 and a lower side 22, with the mobile mass having an upper side 11, in the same plane N1 as the upper face of substrate 21 and a lower side 12.

In this embodiment, the means of preventing the mobile mass 3 from moving in the sensor plane (plane xOy in FIG. 3A) is achieved by a substantial width L for the pivot zone 5" in the direction of the rotation axis H (FIG. 3B). This width can be close to the width of the mass 3 itself, measured parallel to the H axis while being advantageously less than the length of the mobile mass 3.

The height h of the pivot zone 5" is shown here as less than that of the mobile mass T and greater that the thickness e of the strain gauges, such as in FIG. 1E or 1F, with the same result, already explained above. Alternatively, the pivot zone can also be of the same thickness as the mobile mass, as in the case shown in FIG. 1A. As an alternative, the pivot zone could be placed on top of the device so that it has a common plane, with mass 3, the plane N1, upper plane thereof.

In this embodiment of the invention, two strain gauges 6 and 6' are present. They are positioned in an anti-symmetrical fashion as shown in FIG. 3B:
  in relation to a perpendicular plane to the H axis and going through the center of gravity G;
  and in relation to a plane containing the H axis and perpendicular to the sensor plane.

It could therefore be said that they are differentially mounted. A differential assembly allows a movement of the mobile mass according to the axis which is sensitive to detection, a movement according to the Z axis in the case of the invention, resulting on each of these two gauges in an opposite direction strain. In particular, for any movement according to the Z axis, at least one of the gauges will be under strain and at least another will be under compression.

These two 6 and 6' gauges are situated above the upper plane N1 of the mobile mass 3, or in the vicinity of this plane which is situated at the side of the front face of substrate 2. The lower part of these gauges is therefore situated in the upper plane N1 of the mobile mass 3. They are advantageously formed by deposition.

Alternatively, they could be formed by etching and situated at the level of the lower plane N2 of the lower face 12 of the mobile mass 3 (in which case, the lower part of the gauges would be in this plane N2). They are parallel to each other and are all lying perpendicular to the H axis (see FIG. 3A). They are also connected to a fixed part 50 of the device.

A movement of the mobile mass 3 according to J creates a traction force F on one of the two 6, 6' gauges and compression on the other 6', 6 gauge. The force can therefore be measured in a differential fashion. The advantage of this assembly is that the measurement of the strain can be done by difference between the values of the strains measured on the gauges. As such, it is possible to avoid parasite strains (for example due to temperature) which, identical for the two gauges 6 and 6', are cancelled during the differential measurement. This makes it possible to obtain greater measurement accuracy. It can also be said that the two gauges are differentially mounted.

So that the gauges properly measure the variations in forces imposed by movement J of the mobile mass, this embodiment of the invention can include extensions 32 and 33 of the mobile mass 3, in the plane of the latter and slightly parallel to the H axis, which does not impede the movement of this mass 3 and which allows the application points of the force on the gauges to be vertical to the H pivot axis. These points of application are therefore located in a plane containing the H axis and perpendicular to the planes of the sensor and substrate. This makes it possible to increase the lever arm and therefore to improve the sensor sensitivity.

Similarly, in the other embodiments of the invention, the different zones are advantageously such that it is easily possible to position the application points of the strains, coming from a movement of the mobile mass 3, on the gauges, vertically to the H torsion axis. This position is obtained by forming extensions (31, 32, 33) in the zone of first thickness forming mobile mass. These extensions, so as not to modify the positioning of the H pivot axis, are not in contact with the pivot zone 5. As such, the gauges, in contact with these extensions are preferably not situated above the pivot zone 5, in other words there is no plane perpendicular to the H torsion axis which crosses a gauge as well as a part of the pivot zone.

As has been set out hereinabove, the strain gauge(s) can also be a detection resonator. In the case of detection resonators, the differential measurement of strain is made using an electronic device able to calculate the strains applied to each of the strain gauges according to the variations in vibration frequency when a strain is applied. This electronic device is in addition able to calculate a subtraction of one of the strains, measured on a first gauge in relation to the other strain, measured on a second gauge.

In the case of the variable resistance type strain gauges, for example in piezo-resistive material, the measurement in differential mode of resistance variations imposed by a movement of the mobile mass 3 is advantageously embodied by means of a Wheatstone bridge, shown in FIGS. 3C and 3D.

In a differential Wheatstone bridge, the four branches each have an R value resistance. A $V_{AB}$ voltage measurement between two points A and B opposite the bridge makes it possible to measure the difference $2\alpha R$ between the resistances on both sides of one of these two points, of values $R(1+\alpha)$ and $R(1-\alpha)$ and which inversely vary in relation to one another (FIG. 3C).

The two gauges 6, 6' in FIG. 3D can each form an arm of a differential Wheatstone bridge. A known resistance value R is associated with each of these gauges, at rest.

In order to form a differential Wheatstone bridge, a voltage measurement point B is chosen between the two gauges 6 and 6', here on the 5" pivot zone. From the position of the two gauges (on either side of the perpendicular plane of the substrate passing through the axis H of rotation) a rotation of the mobile mass 3 induces the application of opposite strains on both gauges and therefore a $\alpha R$ strain variation on one of the gauges and $-\alpha R$ on the other gauge.

The Wheatstone bridge is made with two other resistances 140, 140', as shown in FIG. 3D. Another measurement point A is positioned between these two resistances.

Thus formed, the differential Wheatstone bridge makes it possible to calculate the $2\alpha R$ resistance variation between the resistance gauges, this resistance variation being imposed on the gauges 6, 6' by the rotation of mobile mass 3. This method makes it possible to avoid noise due to the variations of the parasite resistance of the strain gauges, for example owing to thermal dilatation. Current input is made by one of the gauges 6 for example, and the current output occurs through the second strain gauge 6'.

The same type of measurement could be obtained with two gauges 4 and 4' situated at the level of the lower plane N2 of the mobile mass 3.

A third embodiment of the invention, of the mass sensor type, is shown in FIGS. 4A to 4D. This sensor can be applied to the realization of a chemical sensor.

This device can be based on the basic structure of one or other of the first embodiments of the invention.

Indeed, such a device includes a first zone, which can be assimilated to a mobile mass 3, linked to the substrate 2 forming the sensor by a pivot zone which can have a thickness which is lesser or equal to the first zone. This pivot zone can have a common plane with the mobile mass 3, at least the lower face 12 of the mobile mass 3. The second zone (pivot zone) is such that the movements of the mobile mass 3 are limited to one rotation around an H axis, included in the substrate plane, going through the second zone. Therefore the movement is once again of the "out of plane" of the substrate type. Further to these two first zones is a third zone, comprising at least one strain gauge.

As in the previous embodiments, the strain gauge 4 can be of the detection resonator type or preferably of the variable resistance suspended gauge type, preferably of the piezo-resistive type, with a single or double gauge.

As in the previous embodiments, there can be several 4 and 4' strain gauges, preferably differentially positioned.

In the example illustrating this embodiment, the structure shown is of the type shown in FIGS. 1A and 1B, but one of the structures of the FIGS. 9A-9D can also be taken, for example.

The difference between this embodiment of the invention and the two previous embodiments is the presence of a means of triggering the vibration of the mobile mass 3.

Figure 4A:
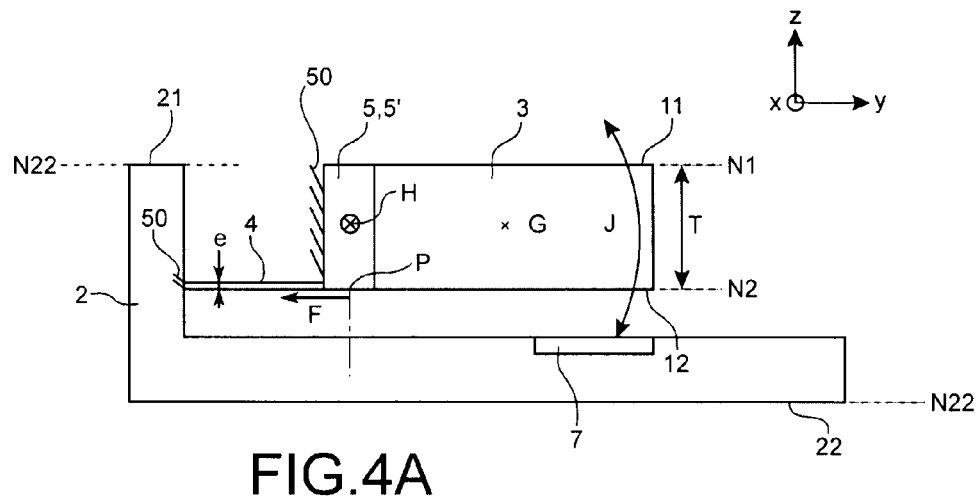
FIGS. 4A to 4E show a drawing of a device according to the invention, of the vibrating mass sensor type, according to a first (FIGS. 4A and 4B), a second (FIGS. 4C and 4D), and a third (FIG. 4E) means of making the mobile mass vibrate.
Figure 4B:
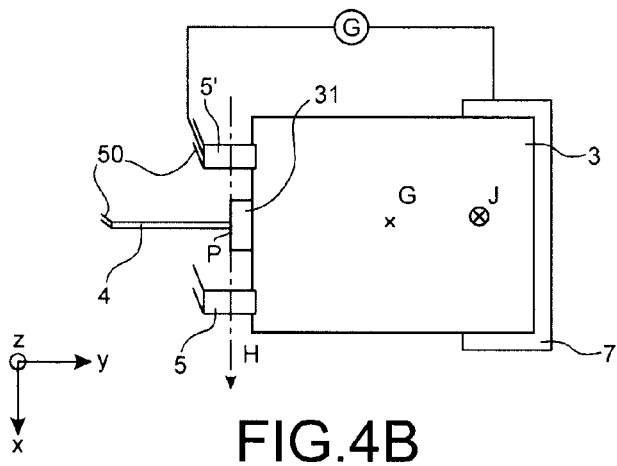

This means of triggering vibration can be in the form of an electrode 7 positioned under all or part of the mobile mass; applying a periodic voltage to electrode 7 leads to triggering a movement of the mobile mass 3 according to a vibration with the same period or frequency as the excitation (FIGS. 4A and 4B). The mass 3 is then in conductive or semi-conductive material, for example, in metal or in doped silicon at more than $10^{15}$ at/cm$^3$.

Figure 4C:
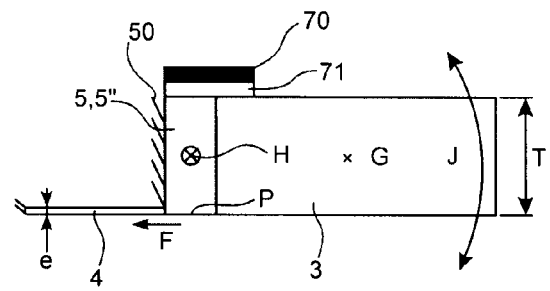
Figure 4D:
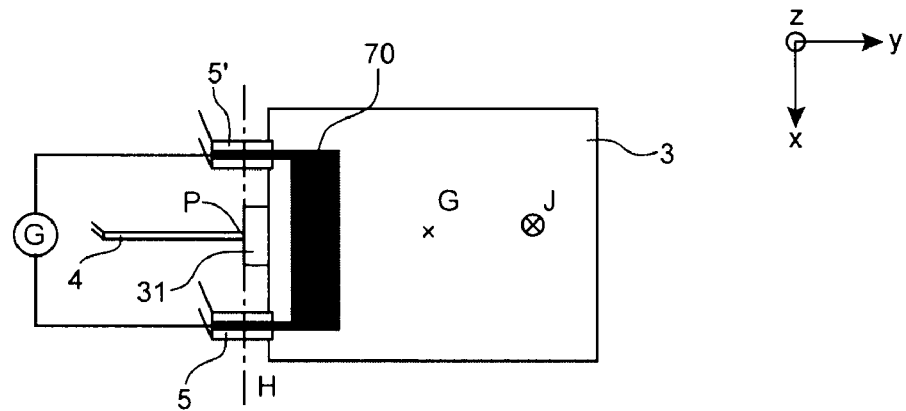

Alternatively, the means of triggering the vibration can be formed by a bimetal composed of a conductive layer 70, for example metallic, deposited above pivot axis H and partially on the mobile mass, electrically insulated from the mobile mass 3 by an insulation layer 71, this deposited layer having a thermal dilatation coefficient different of that of the material of the mobile mass (FIG. 4C et 4D). The movement triggering of the mobile mass is thus done by a dilatation difference between the two materials during a local increase in the temperature obtained for example, by circulating a current through the structure, which leads to a bimetal effect at the level of the hinge formed by pivot zone 5.

Figure 4E:
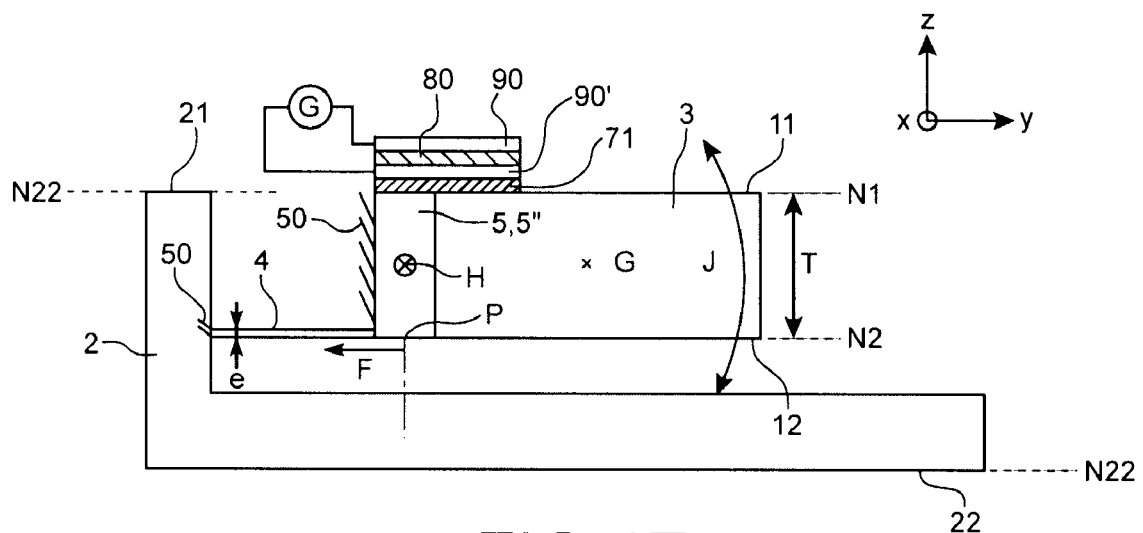

According to another alternative, the means of triggering the vibration of the mobile mass can be composed of a layer of piezo-electrical material 80, placed above at least one portion of the mobile mass from which it is separated by a layer 71 of insulating material, connected at both ends to a system for applying a periodically variable voltage (FIG. 4E). Applying a periodic variable voltage to the piezo-electrical layer causes a periodic deformation of the latter and therefore the vibrating of the mobile mass 3. A voltage is applied for example to electrodes 90, 90', on the one hand above the piezo-electrical layer 80 and on the other between the piezo-electrical layer and the insulating layer 71, said electrodes being connected to a voltage generator.

During the vibrating of the mobile mass, a strain is applied to the strain gauges 4.

In the case of a chemical or biochemical mass sensor, if the mobile mass 3 adsorbs or absorbs molecules at its surface or in its volume (for example after functionalizing this surface or this volume), then the global mass increases. This results in a variation of the vibration frequency.

In measuring the variation of the resonance frequency of the mass, it is possible to calculate the adsorbed or absorbed mass.

In a device according to this embodiment, it is possible to functionalize the surface of the mobile mass, by adding a coating for example which permits the selection adsorption of a molecule or of a type of molecule. This coating, as an example, can be a layer of a specific material, for example a functionalization layer of polymer. It is then possible to calculate the quantity of adsorbed molecules.

A first process of making a device according to the invention will be described in relation to FIGS. 5A-5G and 6A-6F. It corresponds to the case of an etched gauge (as shown in FIG. 1A). The gauge shown here is of the resonator type.

This first process uses an epitaxy of a semi-conductor material (here silicon but this process can also be applied in the case of SiGe).

Figure 5A:
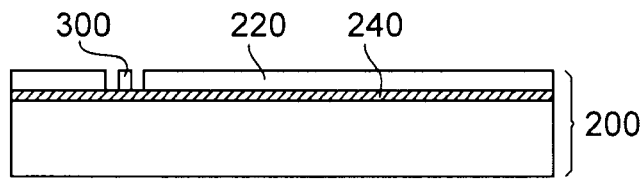

First of all an SOI substrate 200 is selected (FIG. 5A). For example, it includes a layer 220 of Si of 0.5 μm thickness and a layer 240 of oxide $SiO_2$ of 1 μm thickness.

A portion 300 of the piezo-resistive gauge (FIGS. 5A and 6A) or a resonator and detection and excitation electrodes are defined by lithography and etching of layer 220. This part is therefore defined in the semi-conductor surface layer which has a reduced thickness.

Figure 5B:
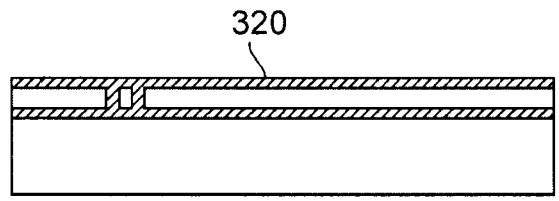
Figure 5C:
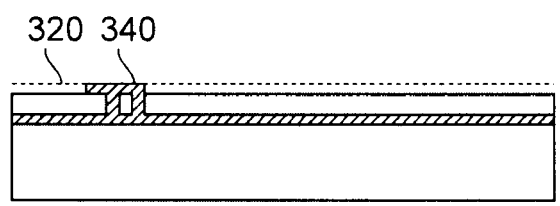
Figure 5D:
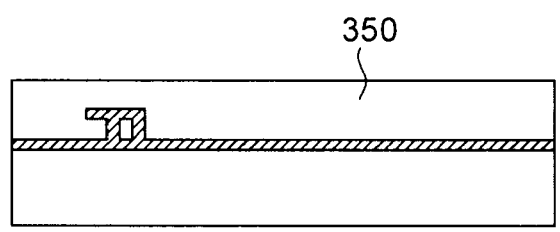
Figure 5E:
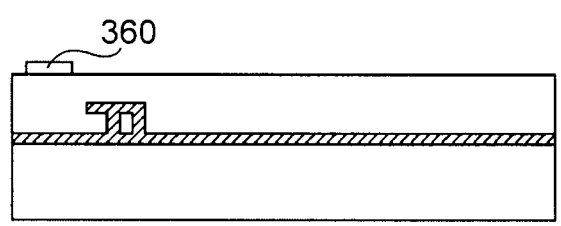
Figure 5F:
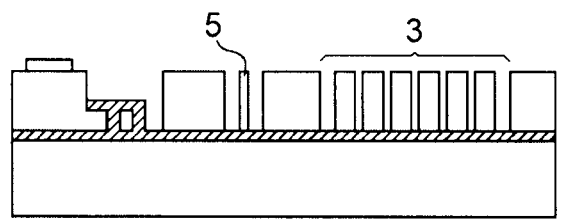
Figure 5G:
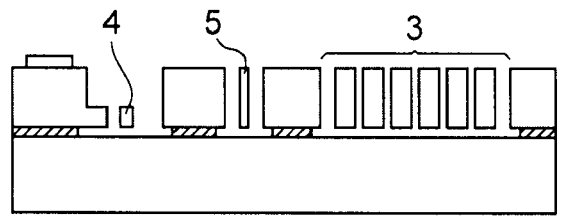

Etching is stopped on layer 240 of $SiO_2$. Then a layer (not shown) of $SiO_2$ is deposited, for example a layer of 0.5 μm, followed by a planarization with stopping on Si layer 220, then by a deposition 320 of $SiO_2$, for example approximately 0.4 μm in thickness (FIG. 5B).

Then (FIGS. 5C and 6B) a protection 340, above the strain gauge, is made by lithography and etching of a layer 320 of $SiO_2$.

A Silicon 350 epitaxy is then made (FIGS. 5D and 6C), on the initial semi-conductor superficial layer 220. The thickness of the epitaxied layer can be greater than the thickness of the layer 320, for example approximately 4 μm.

A Ti/Ni/Au metallic deposit, then steps of lithography and etching are carried out (FIGS. 5E and 6D) in order to form the contacts 360.

Lithography and anisotropic etching of the mechanical structure are then carried out (for example: DRIE) (FIGS. 5F and 6E), with stopping on the $SiO_2$ dioxide layer 240. This step, during the course of the same operation, makes it possible to realize the mobile mass 3 and hinge 5 using the same thickness of material.

The device is finally liberated by HF etching (wet or steam) of the layer 240 (FIGS. 5G and 6F), with stopping at time. On these FIGS. 5G and 6F, gauge 4 can also be clearly seen.

This process can be adapted to the case of a piezo-resistive gauge by avoiding the stages or forming detection and excitation electrodes.

A second process will be described in liaison with FIGS. 7A-7J and 8A-8H. It corresponds to the case of a deposited gauge (as shown in FIG. 1C). Here the gauge is of the polycrystalline silicon type (it can alternatively be of the monocrystal silicon type or mono- or poly-crystalline SiGe).

Figure 7A:
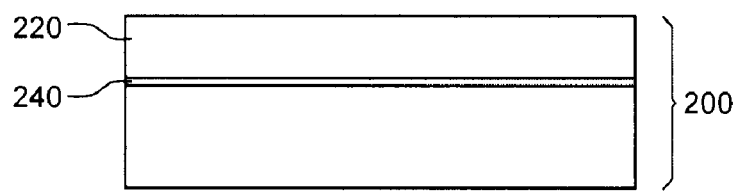
FIGS. 7A-7J and 8A-8H show a second embodiment of a process according to the invention.

A SOI 200 substrate is selected (FIG. 7A). For example, it includes a layer 220 of Si of 4 μm thickness and a layer 240 of $SiO_2$ oxide of 1 μm thickness.

Figure 7B:
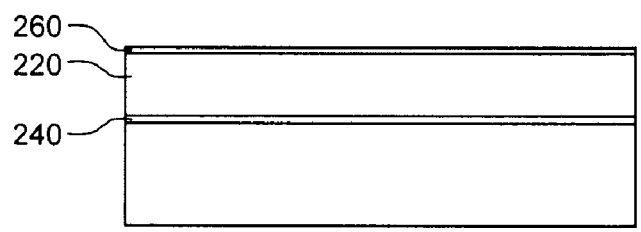
Figure 7C:
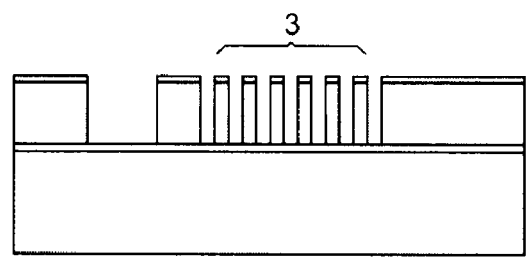
Figure 7D:
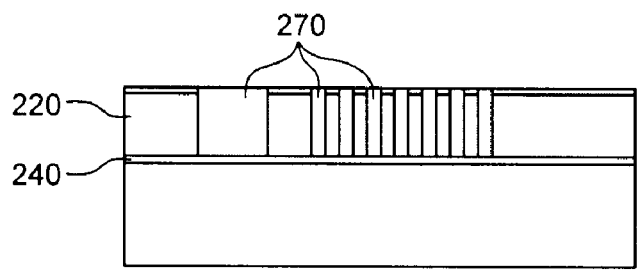

A layer 260 of SiN, of approximately 0.5 μm, is deposited, to electrically insulate the substrate gauges, it can also be used as a stop layer for the planarization (FIG. 7B).

Lithography and etching of the SiN layer and an anisotropic etching (for example: DRIE) of the mechanical structure (FIGS. 7C and 8A), are then carried out, with stopping on the $SiO_2$ 240 dioxide layer. This stage makes it possible to realize the mobile mass 3 and also to define the pivot zone.

$SiO_2$ 270 (FIGS. 7D and 8B) is then deposited, filling at least the etched zones of layer 220.

Then, a planarization stage with stopping on the SiN layer 260 is made.

Then a layer 280 (FIGS. 7E and 8C) is deposited on the structure previously obtained in order to form the gauge. It is, for example, a deposition of WN (for example 20 nm of thickness) and of Au (for example 100 nm thickness). Alternatively, it is possible to deposit a piezo-resistive type material such as polycrystalline silicon of polycrystalline SiGe. The gauge is then defined by lithography and etching.

Figure 7E:
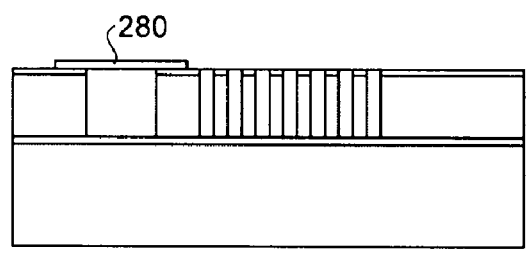
Figure 7F:
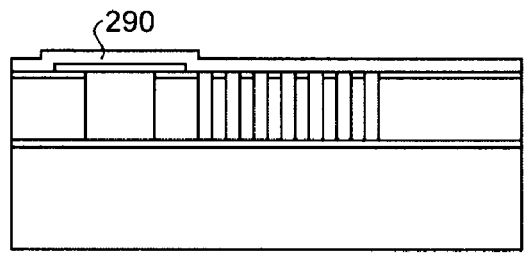
Figure 7G:
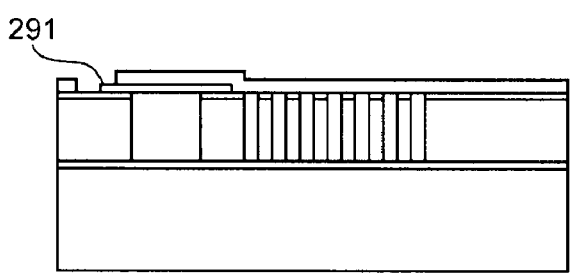
Figure 7H:
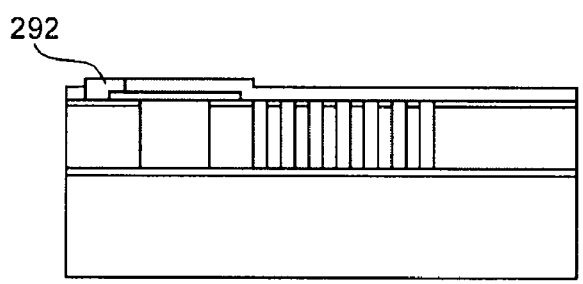
Figure 7I:
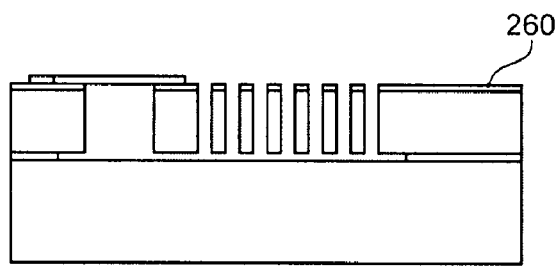
Figure 8A:
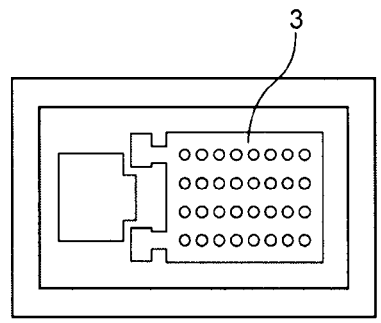
Figure 8E:
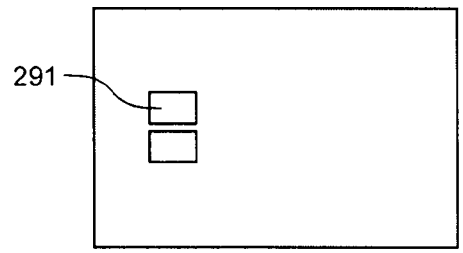
Figure 8B:
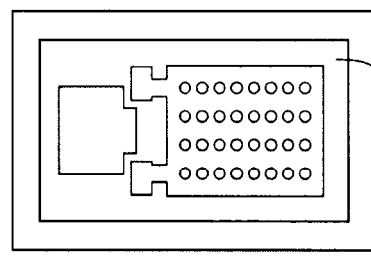
Figure 8F:
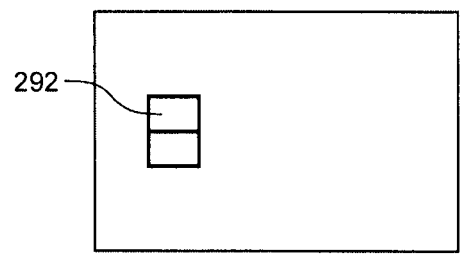
Figure 8C:
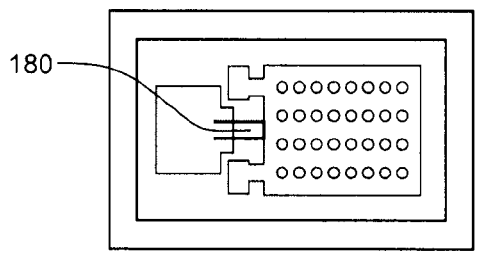
Figure 8G:
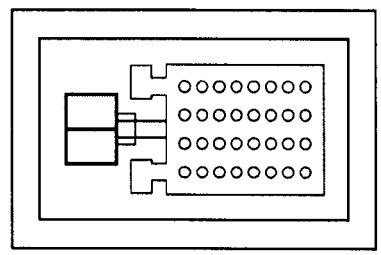
Figure 8D:
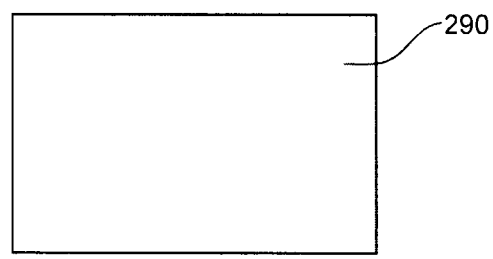

A deposition of $SiO_2$ 290, for example with a thickness of 0.4 μm, is then made over the whole structure (FIGS. 7F and 8D).

The contact zones 291 in this layer 290 (FIGS. 7G and 8E) are open by lithography and etching.

Then a deposition 292 (FIGS. 7H and 8F) is made in the zones 291. It is, for example, a deposition of WN and Au. It can be defined precisely by lithography and etching.

The device is finally liberated by HF etching (wet or steam) of the deposit 270 of $SiO_2$ (FIGS. 7I and 8G), with stopping at time.

Figure 7J:
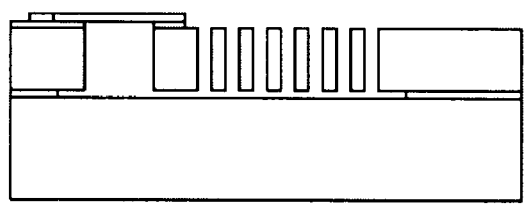
Figure 8H:
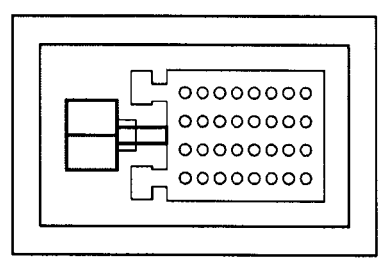

The layer 260 of SiN is finally etched onto the surface (FIGS. 7J and 8H).

This process can be adapted in the case of a resonator type gauge by adding an excitation layer in piezo-electrical or thermo-electrical material above the metallic or piezo-resistive layer of the gauge 280, described in FIGS. 7E and 8C. This deposition can be carried out before or after the definition of the shape of the gauge by lithography. The second case, requires an additional stage of lithography in order to limit the deposition of the excitation layer over a portion of the gauge 280.

In the embodiments which have been presented above, the second zone, or pivot zone, is slightly directed (FIGS. 3B, 3D), or contains (FIGS. 1B, 1D, 1G, 2B, 2C) portions, along a y axis (see in particular FIGS. 1A and 1B), which is slightly perpendicular to the H axis.

Alternatively, it is possible to have a pivot link directed along the X axis, as shown in FIGS. 9A-9D, which are views from above a device according to the invention. The pivot link is then stressed in a torsion mode whereas, in the previous embodiments, the pivot link is stressed in bending.

Similar to before, the strain gauge is linked to the mass in a plane parallel to the plane of the sensor but which does not contain the H axis.

On FIGS. 9A-9D, numerical references identical to those on the previous figures designate identical or similar elements. In particular, reference 50 is a fixed zone of the device, to which elements 55, 55' constituting the second zone and the third zone 4 are linked.

In FIG. 9A and FIG. 9B, the parts constituting the second zone are directed along the X axis parallel to the H axis, in particular two arms placed on either side of the mass 3.

On FIG. 9B, the link of the third zone 4 with the mass 3 is made in a gap or in a zone 30 which is hollowed out of this mass 3.

In FIG. 9C and in FIG. 9D, the parts constituting the second zone are placed inside the mass 3. This includes, again, a hollowed out zone 30', inside which the parts 55, 55' constituting the second zone are placed. This embodiment does not prevent the end of these parts 55, 55', from being linked, once again, to a fixed part 50 of the device.

In FIG. 9D, a differential measurement is made, on the principle of what has already been described above, for example in liaison with FIGS. 3B and 3D.

As can be understood according to the explanations above, the pivot link can be realized ether inside of the mass 3, or outside of this mass (see particularly the embodiment in FIGS. 9C and 9D).

The process of realization which has been described above in liaison with the FIGS. 5A-8H can be adapted to the realization of devices in figures 9A-9D, with the additional stages of etching zones 30, 30'.

The structures in FIGS. 9A-9D are compatible with the realization of a mass sensor as described above in liaison with the FIGS. 4A-4D.

The invention claimed is:

1. A MEMS surface sensor, comprising:
   a substrate, a surface of which defines a substrate plane;
   a first zone having a first thickness, of which two surfaces form a first plane and a second plane parallel in relation to one another and to the substrate plane, first zone forming at least one mobile mass that moves in a direction out of the substrate plane;
   a second zone, linked to a fixed zone of the substrate, the second zone forming at least a pivot link of the mobile mass in relation to said substrate, and having a thickness less or equal to that of the mobile mass and being linked to the mobile mass, an axis of the pivot link being between the first plane and the second plane, and parallel to the first plane and the second plane, the mobile mass moving in the direction out of the substrate plane about the axis of the pivot link, the second zone having, along a direction perpendicular to the substrate plane, a lower part and an upper part, at least one of the upper part of the second zone and the lower part of the second zone being in the first plane or in the second plane common to the first and second zones;
   a third zone of a lesser thickness than that of the second zone, forming at least a suspended strain gauge that detects movement of the mobile mass around the axis of the pivot link in the direction out of the substrate plane, the third zone having, along a direction perpendicular to the substrate plane, a lower part and an upper part, one of the upper part of the third zone or the lower part of the third zone being in a plane common with the first zone or with the second zone, and the third zone
      extends in a plane parallel to the substrate plane not containing the axis of the pivot link,
      extends perpendicular to a rotation axis of the pivot link, and
      is linked to the mobile mass on one side and to the substrate on another.

2. The sensor according to claim 1, wherein the second zone:
   has a width, along a direction of the pivot axis H, less than a width of the mobile mass along the direction of the pivot axis;
   or includes two extended arms, disposed on either side of the mobile mass or in a gap made in this mobile mass.

3. The sensor according to claim 1, wherein the mobile mass has a thickness strictly greater than that of the second zone.

4. The sensor according to claim 1, wherein the third zone and the first zone:
   have a common plane, which is the second plane of the mobile mass and the third zone and the first zone are situated on a same side in relation to the common plane,
   or have a common plane, which is the second plane of the mobile mass, and is situated on both sides of the common plane.

5. The sensor according to claim 1, wherein the axis of the pivot link is in a plane parallel to the first plane and to the second plane of the sensor, and extends through a center of gravity of the mobile mass.

6. The sensor according to claim 1, wherein application points of strains produced by the mobile mass on each strain gauge being in a perpendicular plane to each of the first plane and second plane and including the axis of the pivot link.

7. The sensor according to claim 1, wherein the third zone includes at least two strain gauges, situated in an anti-symmetrical fashion in relation to each other and in relation:
   to a plane perpendicular to the first and second planes of the mobile mass and including the axis of the pivot link,
   and to a plane perpendicular to the axis of the pivot link.

8. The sensor according to claim 1, wherein the strain gauge includes a piezo-resistant material.

9. The sensor according to claim 8, wherein the strain gauge is single branch or double branch.

10. The sensor according to claim 1, wherein the strain gauge includes at least a detection resonator, including at least a vibrating blade vibrating in a plane parallel to the first and second planes, a means for exciting the vibrating blade, and a means for detecting the vibration.

11. The sensor according to claim 10, wherein the means for exciting the vibrating blade is electrostatic, and the sensor includes electrostatic means for detecting resonance.

12. The sensor according to claim 11, wherein the strain gauge includes at least one electrode placed, in relation to the vibrating blade, in a direction of the vibration.

13. The sensor according to claim 10, wherein the strain gauge includes piezo-resistive means for resonance detection, disposed on the vibrating blade.

14. The sensor according to claim 1, also including means for triggering movement of the mobile mass.

15. The sensor according to claim 14, wherein the means for triggering movement of the mobile mass includes:
   an electrode present on, or in, the substrate with regard a side of the mobile mass,
   or a layer of conductive material disposed on the mobile mass and linked to the substrate, electrically insulated from the mobile mass by an insulation layer, forming a bimetal with the mobile mass,
   or a layer of piezo-electric material disposed on the mobile mass and linked to the substrate, electrically insulated from the mobile mass by an insulation layer.

16. The sensor according to claim 1, comprising, on a surface of the mobile mass, means for selecting a molecule capable of being surface adsorbed or absorbed.

* * * * *